(12) United States Patent
Sandy et al.

(10) Patent No.: US 7,254,039 B2
(45) Date of Patent: Aug. 7, 2007

(54) 3U PAYLOAD MODULE CONFIGURATIONS

(75) Inventors: Douglas L. Sandy, Chandler, AZ (US); Jeffrey M. Harris, Chandler, AZ (US); Robert C. Tufford, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 352 days.

(21) Appl. No.: 10/973,733

(22) Filed: Oct. 25, 2004

(65) Prior Publication Data

US 2006/0087824 A1    Apr. 27, 2006

(51) Int. Cl.
*H01R 12/00* (2006.01)
*G06F 13/00* (2006.01)

(52) U.S. Cl. .................... 361/788; 361/796; 361/803; 710/301; 710/305

(58) Field of Classification Search ................ 361/788, 361/796, 752, 803; 710/301, 305, 312–316; 439/61, 62, 74, 76.1
See application file for complete search history.

(56) References Cited

U.S. PATENT DOCUMENTS

| | | | | |
|---|---|---|---|---|
| 6,098,133 | A * | 8/2000 | Summers et al. | 710/107 |
| 6,349,037 | B1 * | 2/2002 | Draughn et al. | 361/788 |
| 6,390,890 | B1 * | 5/2002 | Molnar | 451/41 |
| 6,711,028 | B2 * | 3/2004 | Iny | 361/788 |
| 6,748,474 | B1 * | 6/2004 | Caldara et al. | 710/301 |
| 6,922,342 | B2 * | 7/2005 | Doblar et al. | 361/736 |
| 7,083,422 | B2 * | 8/2006 | Campini et al. | 439/61 |
| 7,088,711 | B2 * | 8/2006 | Goergen et al. | 370/360 |
| 7,102,893 | B1 * | 9/2006 | MacArthur et al. | 361/788 |
| 2002/0059492 | A1 * | 5/2002 | Sabotta et al. | 710/301 |
| 2004/0078506 | A1 * | 4/2004 | Wong et al. | 710/301 |

* cited by examiner

*Primary Examiner*—Dean A. Reichard
*Assistant Examiner*—Dameon E. Levi

(57) ABSTRACT

A multi-service platform system (100, 200, 300, 400) includes a computer chassis (101, 201, 301, 401) having a plurality of 3U slots (205), a backplane (104) integrated in the computer chassis, a switched fabric (106) on the backplane. At least one of a VMEbus network and a PCI network are coincident with the switched fabric on the backplane. A payload module (102) having a 3U form factor is coupled to interface with one of the plurality of 3U slots, where the payload module is communicatively coupled with the backplane using the switched fabric and at least one of the VMEbus network and the PCI network. At least one multi-gigabit connector (118) is coupled to a rear edge (119) of the payload module, where the at least one multi-gigabit connector is coupled to communicatively interface the payload module to the backplane, and where the switched fabric and at least one of the VMEbus network and the PCI network are communicatively coupled with the payload module through the at least one multi-gigabit connector.

22 Claims, 2 Drawing Sheets

3U PAYLOAD MODULE CONFIGURATIONS

BACKGROUND OF THE INVENTION

Payload modules and switch modules can be added to computer systems to augment or expand functionality. Current expansion cards interface and communicate with computer systems using primarily a multi-drop parallel bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. However, some applications have requirements for simultaneous high bandwidth transfers between modules that cannot be handled by the multi-drop parallel bus architecture.

In the prior art, 6U form factor cards are common. The 3U form factor offers an advantage for applications where physical space is at a premium. Prior art 3U form factor expansion cards interface with a backplane using multi-drop parallel networks. This has the disadvantage of being slow and cumbersome for network expansion.

Accordingly, there is a significant need for an apparatus and method that overcomes the deficiencies of the prior art outlined above.

BRIEF DESCRIPTION OF THE DRAWINGS

Referring to the drawing.

Figure 1:
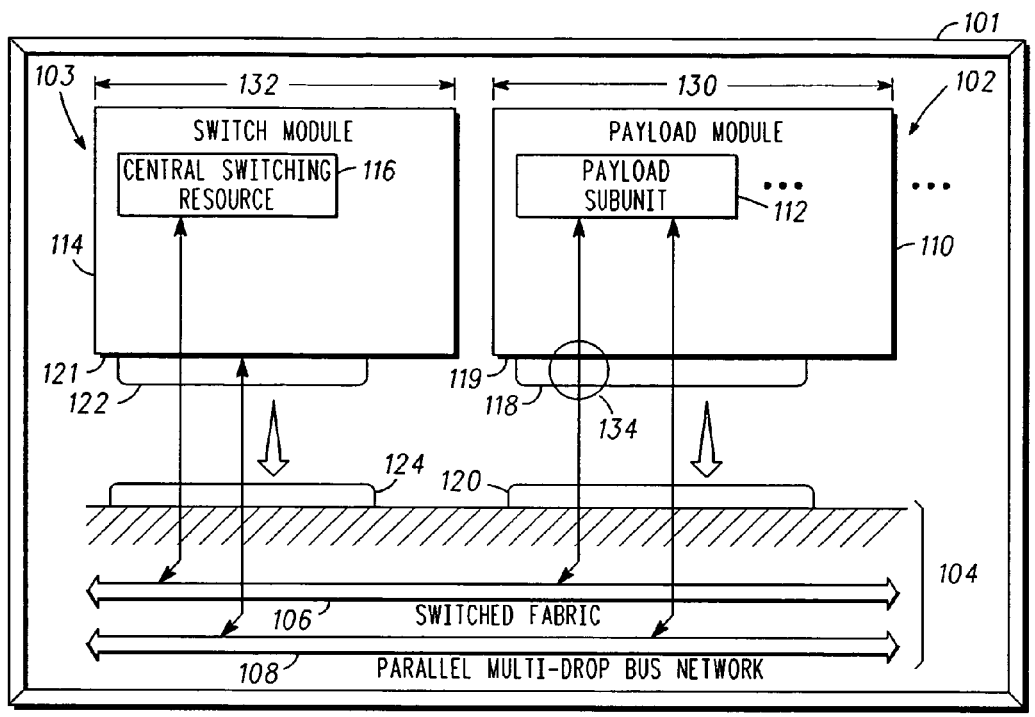
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. Multi-service platform system 100 can include computer chassis 101, with software and any number of slots for inserting modules, which can be, for example and without limitation, a payload module 102, a switch module 103, and the like. Payload module 102 can add functionality to multi-service platform system 100 through the addition of processors, memory, storage devices, device interfaces, network interfaces, and the like. In an embodiment, multi-service platform system 100 can be an embedded, distributed processing computer system, where computer chassis 101 is an embedded computer chassis.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

Multi-service platform system 100 can include backplane 104 coupled for receiving payload module 102 and switch module 103. Backplane 104 can include hardware and software necessary to implement a coincident parallel multi-drop bus network 108 and a switched fabric 106. Backplane 104 can include switched fabric 106 and a parallel multi-drop bus network 108. In an embodiment, both switched fabric 106 and parallel multi-drop bus network 108 run concurrently on backplane 104.

In an embodiment, parallel multi-drop bus network 108 can be a VMEbus network. VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network can include VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network 108 is not limited to the use of these VMEbus based protocols and other VMEbus based protocols are within the scope of the invention.

In another embodiment, parallel multi-drop bus network 108 can be a Peripheral Component Interconnect (PCI) network. PCI network can include standard PCI or Peripheral Component Interconnect-X (PCI-X) based protocols. Examples of variants of PCI-X protocols, without limitation, include 133 MHz 64-bit PCI-X, 100 MHz 64-bit PCI-X down to 66 MHz 32-bit PCI-X, and the like. Examples of PCI based protocols (a subset of PCI-X based protocols), can include 66 MHz 64-bit PCI down to 33 MHz 32-bit PCI, and the like.

Switched fabric 106 can use switch module 103, particularly central switching resource 116 on switch module 103, as a hub. Switch module 103 can be coupled to any number of payload modules 102. Switched fabric 106 can be based on a point-to-point, switched input/output (I/O) fabric, whereby cascaded switch devices interconnect end node devices. Although FIG. 1 depicts switched fabric 106 as a bus for diagrammatic ease, switched fabric 106 may in fact be a star topology, mesh topology, and the like as known in the art for communicatively coupling modules. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network standards, for example and without limitation, InfiniBand™, Serial RapidIO™, FibreChannel™, Ethernet™, PCI Express™, Hypertransport™, and the like. Switched fabric 106 is not limited to the use of these switched fabric network standards and the use of any switched fabric network standard is within the scope of the invention.

In an embodiment of the invention, parallel multi-drop bus network 108 and switched fabric 106 operate concurrently within multi-service platform system 100. In an example of an embodiment, parallel multi-drop bus network 108 can operate as a control plane by synchronizing and organizing activities in multi-service platform system 100. Switched fabric 106 can operate as a data plane by transferring data between individual payload modules 102. In this embodiment, data is transferred faster through the higher bandwidth switched fabric 106, while the parallel multi-drop bus network 108 controls and manages the overall system. This has the effect of increasing the speed of multi-service platform system 100 since data transfers that are in excess of parallel multi-drop bus network 108 bandwidth can take place using switched fabric 106. In an embodiment, payload module 102 is communicatively coupled with backplane 104 using switched fabric 106 and at least one of VMEbus network or PCI network (parallel multi-drop bus network 108).

Multi-service platform system 100 can include any number of payload modules 102 and switch modules 103 coupled to backplane 104. Backplane 104 can include hardware and software necessary to implement a coincident parallel multi-drop bus network 108 and a switched fabric 106.

In an embodiment, payload module 102 can comprise a board 110, for example a printed wire board (PWB), and the like. Coupled to the board 110 can be one or more payload subunits 112. In an embodiment, payload subunit 112 can include any combination of processor, memory, storage, communication devices and the like. Payload subunit 112 can add any type of computing, storage, communication features, and the like, to multi-service platform system 100. In an embodiment, payload module 102 can have a form factor 130, which can refer to physical dimensions, electrical connections, and the like, of payload module 102. In an embodiment, payload module 102 can have one of a 3U form factor or a 6U form factor.

As is known in the art, "U" and multiples of "U" can refer to the width of a module or expansion card. In an embodiment, "U" can measure approximately 1.75 inches. Payload module 102 can have its own specific set of electrical connections to interface with backplane 104 of computer chassis 101. As an example of an embodiment, multi-service platform system 100 can include computer chassis 101 and one or more payload modules 102, each having one of a 3U form factor or a 6U form factor. In an embodiment, such payload modules 102 can conform to the VITA 46 standard as set forth by VMEbus International Trade Association (VITA), P.O. Box 19658, Fountain Hills, Ariz., 85269.

In an embodiment, switch module 103 can comprise a board 114, for example a printed wire board (PWB), and the like. Coupled to the board 114 can be one or more central switching resources 116 that can for example, function as a hub for switched fabric 106. In an embodiment, switch module 103 can include any combination of processor, memory, storage, communication devices and the like. Switch module 103 can add any type of computing, storage, communication features, and the like to multi-service platform system 100. In an embodiment, switch module 103 can have a form factor 132, which can refer to physical dimensions, electrical connections, and the like, of switch module 103. In an embodiment, switch module 103 can have one of a 3U form factor or a 6U form factor.

In an embodiment of the invention, backplane 104 and payload module 102 can have a set of interlocking, modular connectors designed to interlock with each other when payload module 102 is placed in a slot of multi-service platform system 100. In the embodiment shown, payload module 102 has at least one multi-gigabit connector 118 coupled to rear edge 119. In an embodiment, at least one multi-gigabit connector 118 can include printed circuit board (PCB) wafers (as opposed to metal pins), where wafers are held together in a plastic housing and can be coupled to the payload module 102 using press to fit contacts. For example, at least one multi-gigabit connector 118 can use PCB based pinless interconnect that uses printed circuit wafers instead of traditional pin and socket contacts.

In an embodiment, at least one multi-gigabit connector 118 can use at least one of single ended or differential pair 134 signal configuration in the same connector. Multi-gigabit connector 118 can transfer data in excess of three (3) gigabits per second per each differential pair 134. For example, differential pair 134 can couple payload subunit 112 to switched fabric 106 and transfer data to or from payload subunit 112 at a rate in excess of three gigabits per second. In an embodiment, differential pair 134 can be a bonded differential pair. At least one multi-gigabit connector 118 is coupled to communicatively interface payload module 102 with backplane 104, where switched fabric 106 and at least one of VMEbus network or PCI network (parallel multi-drop bus network 108) are communicatively coupled to payload module 102 through at least one multi-gigabit connector 118.

In an embodiment, at least one multi-gigabit connector 118 is coupled to interface with at least one corresponding multi-gigabit connector 120 on backplane 104. At least one corresponding multi-gigabit connector 120 can be a female receptacle with metal beam spring leaf contacts which engage with the PCB wafers of multi-gigabit connector 118 when coupled together.

In an embodiment, at least one multi-gigabit connector 118 spans substantially the entire portion of the rear edge 119 of payload module 102. Rear edge 119 can include any number of multi-gigabit connectors 118 and be within the scope of the invention. In an embodiment, all communication between payload module 102 and backplane 104 occur exclusively through at least one multi-gigabit connector 118. In this embodiment, rear edge 119 of payload module 102 excludes a legacy connector, which can include traditional pin and socket connectors designed for low-speed data transfer. In other words, all data transfer and communication, whether to/from switched fabric 106 and at least one of VMEbus network or PCI network (parallel multi-drop bus network 108) occur through at least one multi-gigabit connector 118.

In an example of an embodiment of the invention, at least one multi-gigabit connector 118 and corresponding at least one multi-gigabit connector 120 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

In an embodiment, multi-service platform system 100 can include switch module 103 as described above. In an embodiment, backplane 104 and switch module 103 can have a set of interlocking, modular connectors designed to interlock with each other when switch module 103 is placed in a slot of multi-service platform system 100. In the embodiment shown, switch module 103 has at least one multi-gigabit connector 122 coupled to rear edge 121. In an embodiment, at least one multi-gigabit connector 122 can include printed circuit board (PCB) wafers (as opposed to metal pins), where wafers are held together in a plastic housing and couple to the switch module 103 using press to fit contacts. For example, at least one multi-gigabit connector 122 can use PCB based pinless interconnect that uses printed circuit wafers instead of traditional pin and socket contacts.

In an embodiment, at least one multi-gigabit connector 122 can use at least one of single ended or differential pair (not shown on switch module for clarity) signal configuration in the same connector. Multi-gigabit connector 122 can transfer data in excess of three gigabits per second per each differential pair. For example, differential pair can couple central switching resource 116 to switched fabric 106 and transfer data at a rate in excess of three gigabits per second. In an embodiment, differential pair can be a bonded differential pair. In one embodiment, at least one multi-gigabit connector 122 is coupled to communicatively interface switch module 103 with backplane 104, particularly switched fabric 106. In another embodiment, at least one multi-gigabit connector 122 is coupled to communicatively interface switch module 103 with backplane 104, where switched fabric 106 and at least one of VMEbus network or PCI network (parallel multi-drop bus network 108) are communicatively coupled to switch module 103 through at least one multi-gigabit connector 122.

In an embodiment, at least one multi-gigabit connector 122 is coupled to interface with at least one corresponding multi-gigabit connector 124 on backplane 104. At least one corresponding multi-gigabit connector 124 can be a female receptacle with metal beam spring leaf contacts which engage with the PCB wafers of multi-gigabit connector 122 when coupled together.

In an embodiment, at least one multi-gigabit connector 122 spans substantially the entire portion of the rear edge 121 of switch module 103. Rear edge 121 can include any number of multi-gigabit connectors 122 and be within the scope of the invention. In an embodiment, all communication between switch module 103 and backplane 104 occur exclusively through at least one multi-gigabit connector 122. In this embodiment, rear edge 121 of switch module 103 excludes a legacy connector, which can include traditional pin and socket connectors designed for low-speed data transfer. In other words, all data transfer and communication, whether to/from switched fabric 106 or at least one of VMEbus network or PCI network (parallel multi-drop bus network 108) occur through at least one multi-gigabit connector 122.

In an example of an embodiment of the invention, at least one multi-gigabit connector 122 and corresponding at least one multi-gigabit connector 124 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

Figure 2:
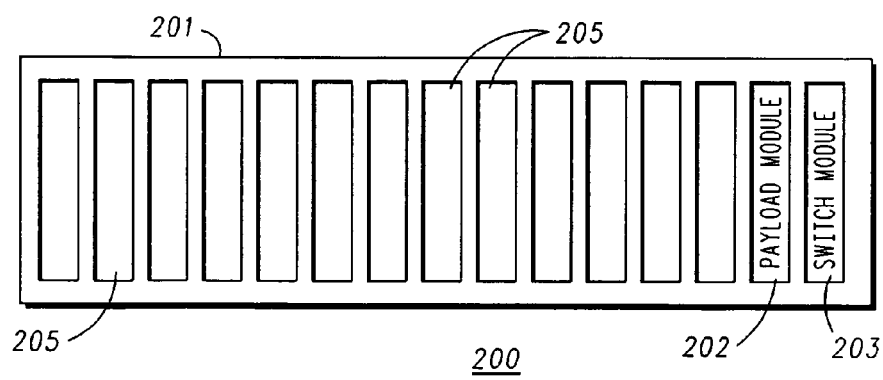
FIG. 2 depicts a multi-service platform system according to another embodiment of the invention.

FIG. 2 depicts a multi-service platform system 200 according to another embodiment of the invention. In the embodiment depicted in FIG. 2, like numbered elements represent elements discussed with reference to FIG. 1.

In the embodiment, depicted in FIG. 2, multi-service platform system includes 3U computer chassis 201 having a plurality of 3U slots 205. In an embodiment, 3U computer chassis 201 and particularly plurality of 3U slots 205 are each coupled to receive a payload module 202 having a 3U form factor or a switch module 203 having a 3U form factor. For example, any of plurality of 3U slots 205 is coupled to receive a payload module 202 having a 3U form factor or a switch module 203 having a 3U form factor, where each of payload module 202 or switch module 203 is communicatively coupled to the backplane. Payload module 202 can be communicatively coupled to the backplane using the switched fabric and at least one of the VMEbus network or the PCI network as described with reference to FIG. 1. In an embodiment, payload module 202 is communicatively coupled to the backplane through the at least one multi-gigabit connector as discussed with reference to FIG. 1.

In an embodiment, at least one of plurality of 3U slots 205 can be coupled for receiving switch module 203 having a 3U form factor. In an embodiment, switch module 203 is coupled for operating switched fabric on backplane through the use of at least one central switching resource as discussed with reference to FIG. 1. In an example of an embodiment where more than one switch module 203 is present in 3U computer chassis 201, switched fabric can be any number of switched fabrics corresponding to the number of switch modules present.

The embodiment depicted in FIG. 2 is not limiting of the invention. Any number of payload modules 202 having a 3U form factor and any number of switch modules 203 having a 3U form factor can be coupled to the backplane of 3U computer chassis 201. Although plurality of 3U slots 205 are depicted as vertically disposed, this is not limiting of the invention. In another embodiment, plurality of 3U slots 205 can be horizontally disposed in a linear or stacked fashion within 3U computer chassis 201. In another embodiment, 3U computer chassis 201 can include any combination of horizontally disposed or vertically disposed plurality of 3U slots 205 and be within the scope of the invention.

Figure 3:
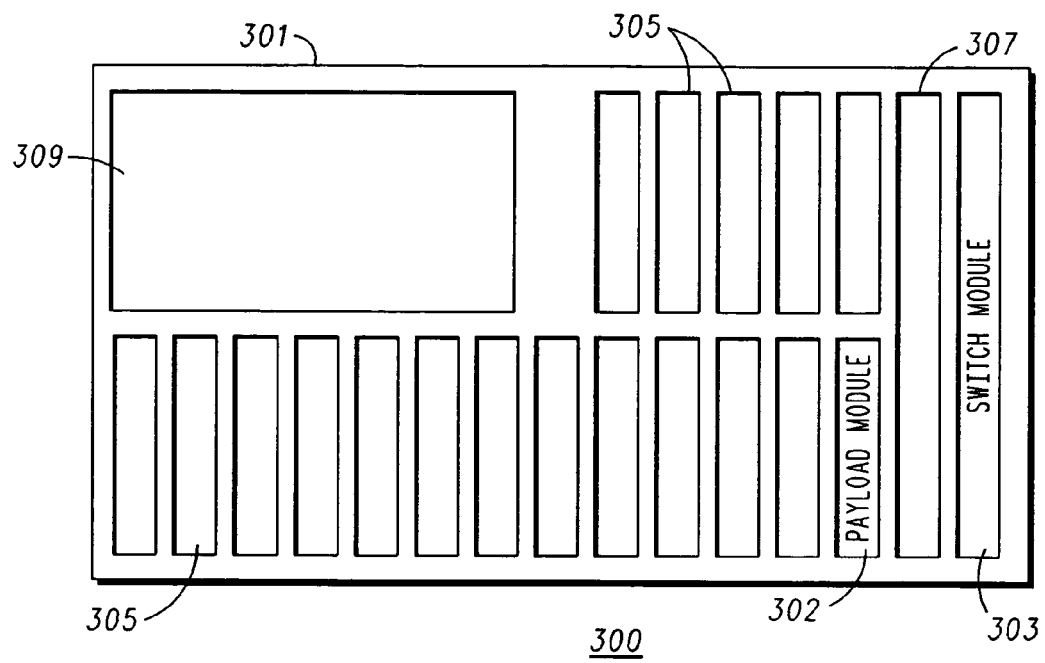
FIG. 3 depicts a multi-service platform system according to yet another embodiment of the invention.

FIG. 3 depicts a multi-service platform system 300 according to yet another embodiment of the invention. In the embodiment depicted in FIG. 3, like numbered elements represent elements discussed with reference to FIG. 1.

In the embodiment, depicted in FIG. 3, multi-service platform system 300 includes 6U computer chassis 301 having a plurality of 3U slots 305 and at least one 6U slot 307. 6U computer chassis 301 can be coupled for receiving modules having a 6U form factor and/or modules having a 3U form factor.

In an embodiment, 6U computer chassis 301 and particularly plurality of 3U slots 305 are each coupled to receive a payload module 302 having a 3U form factor. For example, any of plurality of 3U slots 305 is coupled to receive a payload module 302 having a 3U form factor, where each of payload module 302 is communicatively coupled to the backplane. Payload module 302 can be communicatively coupled to the backplane using the switched fabric and at least one of the VMEbus network or the PCI network as described with reference to FIG. 1. In an embodiment, payload module 302 is communicatively coupled to the backplane through the at least one multi-gigabit connector as discussed with reference to FIG. 1.

In an embodiment, at least one of 6U slots 307 can be coupled for receiving switch module 303 having a 6U form factor. In an embodiment, switch module 303 is coupled for operating switched fabric on backplane through the use of at least one central switching resource as discussed with reference to FIG. 1. In an example of an embodiment where more than one switch module 303 is present in 6U computer chassis 301, switched fabric can be any number of switched fabrics corresponding to the number of switch modules present.

The embodiment depicted in FIG. 3 is not limiting of the invention. Any number of payload modules 302 having a 3U form factor and any number of switch modules 303 having a 6U form factor can be coupled to the backplane of 6U computer chassis 301. Although plurality of 3U slots 305 are depicted as vertically disposed, this is not limiting of the invention. In another embodiment, plurality of 3U slots 205 and at least one 6U slot 307 can be horizontally disposed in a linear or stacked fashion within 6U computer chassis 301. In another embodiment, 6U computer chassis 301 can include any combination of horizontally disposed or vertically disposed plurality of 3U slots 305 or 6U slots 307 and be within the scope of the invention. In another embodiment, switch module 303 having a 3U form factor can be coupled to the backplane and switched fabric through one of the plurality of 3U slots 305.

In yet another embodiment, 6U computer chassis 301 can include a modular bay 309 coupled to receive at least one of a power supply module or a drive module. For example, modular bay 309 can be coupled to receive a power module, where power module can supply power to 6U computer chassis 301 through the backplane. In another embodiment, modular bay 309 can be coupled to receive a drive module, where drive module can include any device or medium for storing or accessing data. For example, drive module can include spinning magnetic media or optical drives such as hard drives, CD-ROM drives, and the like. In another embodiment, drive module can include solid-state devices such as RAM, flash memory, EEPROM, and the like. Any type of drive module is within the scope of the invention. Both power module and drive module can be communicatively coupled to the backplane.

Figure 4:
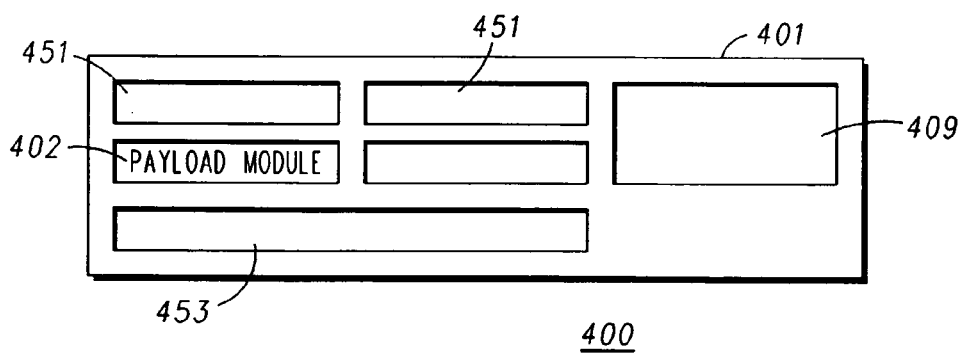
FIG. 4 depicts a multi-service platform system according to still another embodiment of the invention.

FIG. 4 depicts a multi-service platform system 400 according to still another embodiment of the invention. In the embodiment depicted in FIG. 4, like numbered elements represent elements discussed with reference to FIG. 1.

In the embodiment, depicted in FIG. 4, multi-service platform system 400 includes computer chassis 401 having a plurality of horizontally disposed 3U slots 451. Computer chassis 401 can be coupled for receiving modules having a 3U form factor.

In an embodiment, computer chassis 401 and particularly plurality of horizontally disposed 3U slots 451 are each coupled to receive a payload module 402 having a 3U form factor. For example, any of plurality of horizontally disposed 3U slots 451 is coupled to receive a payload module 402 having a 3U form factor, where each of payload module 402 is communicatively coupled to the backplane. Payload module 402 can be communicatively coupled to the backplane using the switched fabric and at least one of the VMEbus network or the PCI network as described with reference to FIG. 1. In an embodiment, payload module 402 can be communicatively coupled to the backplane through the at least one multi-gigabit connector as discussed with reference to FIG. 1.

In an embodiment, computer chassis 401 can include at least one horizontally disposed 6U slot 453 coupled for receiving switch module 403 having a 6U form factor. In an embodiment, switch module 403 is coupled for operating switched fabric on backplane through the use of at least one central switching resource as discussed with reference to FIG. 1. In an example of an embodiment with more than one of horizontally disposed 6U slots 453, where more than one switch module 403 is present in computer chassis 401, switched fabric can be any number of switched fabrics corresponding to the number of switch modules present.

The embodiment depicted in FIG. 4 is not limiting of the invention. Any number of payload modules 402 having a 3U form factor and any number of switch modules 403 having a 6U form factor can be coupled to the backplane of computer chassis 401. In another embodiment, switch module 403 having a 3U form factor can be coupled to the backplane and switched fabric through one of the plurality of horizontally disposed 3U slots 451.

In yet another embodiment, computer chassis 401 can include a modular bay 409 coupled to receive at least one of a power supply module or a drive module. For example, modular bay 409 can be coupled to receive a power module, where power module can supply power to computer chassis 401 through the backplane. In another embodiment, modular bay 409 can be coupled to receive a drive module, where drive module can include any device or medium for storing or accessing data. For example, drive module can include spinning magnetic media or optical drives such as hard drives, CD-ROM drives, and the like. In another embodiment, drive module can include solid-state devices such as RAM, flash memory, EEPROM, and the like. Any type of drive module is within the scope of the invention. Both power module and drive module can be communicatively coupled to the backplane.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:
1. A multi-service platform system, comprising:
a 3U computer chassis having a plurality of 3U slots;
a backplane integrated in the 3U computer chassis;
a switched fabric on the backplane;
at least one of a VMEbus network and a PCI network coincident with the switched fabric on the backplane;
a payload module having a 3U form factor, wherein the payload module is coupled to interface with one of the plurality of 3U slots, and wherein the payload module is communicatively coupled with the backplane using the switched fabric and at least one of the VMEbus network and the PCI network; and at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector.

2. The multi-service platform system of claim 1, wherein communication between the backplane and the payload module occur exclusively through the at least one multi-gigabit connector.

3. The multi-service platform system of claim 1, wherein the at least one multi-gigabit connector spans substantially an entire portion of the rear edge of the payload module.

4. The multi-service platform system of claim 1, wherein the at least one multi-gigabit connector is coupled to interface with at least one corresponding multi-gigabit connector on the backplane.

5. The multi-service platform system of claim 1, further comprising a switch module having a 3U form factor, wherein the switch module is coupled to the backplane through the at least one of the plurality of 3U slots.

6. The multi-service platform system of claim 1, wherein the payload module is horizontally disposed in the 3U computer chassis.

7. The multi-service platform system of claim 1, further comprising a switch module having a 3U form factor, wherein the switch module is coupled to the backplane through the at least one of the plurality of 3U slots, and wherein the payload module and the switch module are horizontally disposed in the 3U computer chassis.

8. A multi-service platform system, comprising:
a 6U computer chassis having a plurality of 3U slots;
a backplane integrated in the 6U computer chassis;
a switched fabric on the backplane;
at least one of a VMEbus network and a PCI network coincident with the switched fabric on the backplane;
a payload module having a 3U form factor, wherein the payload module is coupled to interface with one of the plurality of 3U slots, and wherein the payload module is communicatively coupled with the backplane using the switched fabric and at least one of the VMEbus network and the PCI network; and
at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector.

9. The multi-service platform system of claim 8, wherein communication between the backplane and the payload module occur exclusively through the at least one multi-gigabit connector.

10. The multi-service platform system of claim 8, wherein the at least one multi-gigabit connector spans substantially an entire portion of the rear edge of the payload module.

11. The multi-service platform system of claim 8, wherein the at least one multi-gigabit connector is coupled to interface with at least one corresponding multi-gigabit connector on the backplane.

12. The multi-service platform system of claim 8, further comprising a switch module having a 6U form factor, wherein the 6U computer chassis comprises at least one 6U slot, and wherein the switch module is coupled to the backplane through the at least one of the plurality of 6U slots.

13. The multi-service platform system of claim 12, wherein the 6U computer chassis comprises a modular bay, wherein the modular bay is coupled to receive at least one of a power supply module and a drive module.

14. The multi-service platform system of claim 8, wherein the 6U computer chassis comprises a modular bay, wherein the modular bay is coupled to receive at least one of a power supply module and a drive module.

15. The multi-service platform system of claim 8, further comprising a switch module having a 3U form factor, wherein the switch module is coupled to the backplane through the at least one of the plurality of 3U slots.

16. A multi-service platform system, comprising:
a computer chassis having a plurality of horizontally disposed 3U slots;
a backplane integrated in the computer chassis;
a switched fabric on the backplane;
at least one of a VMEbus network and a PCI network coincident with the switched fabric on the backplane;
a payload module having a 3U form factor, wherein the payload module is coupled to interface with one of the plurality of horizontally disposed 3U slots, and wherein the payload module is communicatively coupled with the backplane using the switched fabric and at least one of the VMEbus network and the PCI network; and
at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector.

17. The multi-service platform system of claim 16, wherein communication between the backplane and the payload module occur exclusively through the at least one multi-gigabit connector.

18. The multi-service platform system of claim 16, wherein the at least one multi-gigabit connector spans substantially an entire portion of the rear edge of the payload module.

19. The multi-service platform system of claim 16, wherein the at least one multi-gigabit connector is coupled to interface with at least one corresponding multi-gigabit connector on the backplane.

20. The multi-service platform system of claim 16, further comprising a switch module having a 3U form factor, wherein the switch module is coupled to the backplane through the at least one of the plurality of horizontally disposed 3U slots.

21. The multi-service platform system of claim 16, further comprising a switch module having a 6U form factor, wherein the computer chassis comprises at least one horizontally disposed 6U slot, and wherein the switch module is coupled to the backplane through the at least one horizontally disposed 6U slot.

22. The multi-service platform system of claim 16, wherein the computer chassis comprises a modular bay, wherein the modular bay is coupled to receive at least one of a power supply module and a drive module.

* * * * *